United States Patent [19]

Van Broekhoven

[11] Patent Number: 4,791,190

[45] Date of Patent: Dec. 13, 1988

[54] REMOVAL OF PALLADIUM COMPOUND CATALYST RESIDUES FROM POLYMER KETONES

[75] Inventor: Johannes A. M. Van Broekhoven, CM Amsterdam, Netherlands

[73] Assignee: Shell Oil Company, Houston, Tex.

[21] Appl. No.: 935,430

[22] Filed: Nov. 26, 1986

[30] Foreign Application Priority Data

Nov. 26, 1985 [NL] Netherlands ............. 8503259

[51] Int. Cl.$^4$ ............................................. C08G 67/02
[52] U.S. Cl. ..................................... 528/483; 528/392
[58] Field of Search ................................. 528/483, 392

[56] References Cited

U.S. PATENT DOCUMENTS

| | | | |
|---|---|---|---|
| 3,689,460 | 9/1972 | Nozaki | 260/63 |
| 3,694,412 | 9/1972 | Nozaki | 260/63 |
| 3,835,123 | 9/1974 | Nozaki | 260/94.9 |
| 3,984,388 | 10/1976 | Shryne et al. | 260/63 |
| 4,076,911 | 2/1978 | Fenton | 526/11.1 |

FOREIGN PATENT DOCUMENTS

| | | |
|---|---|---|
| 121965 | 8/1984 | European Pat. Off. |
| 2046968 | 10/1964 | Japan . |
| 1081304 | 8/1967 | United Kingdom . |

OTHER PUBLICATIONS

Kirk–Othmer Encyclopedia of Chemical Technology, Second Edition, vol. 12, p. 132, 1967.
Encyclopedia of Polymer Science and Technology, 1968, vol. 9, 397–402.
J. Am. Chem. Soc. 1982, 104, 3520-2.
Organometallics 1984, 3, 866–870.
Proc. Ind. Assoc. Cult. Sci. 1985, 68B, 1–5.
Chemtech 1986, 1, 48–51.
Adv. Polym. Sci. 1986, 73–4, 125–44.
Polym. Lett. 1965, 3, 703–7.
Chim. Ind. 1971, 53, 939–940.
J. Mol. Catal. 1983, 18, 117–25.
J. Organomet Chem. 1985, 279, C5–C10.

Primary Examiner—Harold D. Anderson

[57] ABSTRACT

The invention is a process for reducing catalyst residues from a Group VIII metal compound-containing polymer of CO, ethylene and optionally at least one olefinically unsaturated hydrocarbon. The process comprises contacting the polymer with an effective amount of carbon monoxide or a carbon monoxide-containing gas. It is preferable for the process to use a carbon monoxide partial pressure of at least 0.1 bar and a temperature of at least 60° C., which temperature is at least 20° C. higher than that at which the polymers were prepared.

35 Claims, No Drawings

REMOVAL OF PALLADIUM COMPOUND CATALYST RESIDUES FROM POLYMER KETONES

FIELD OF THE INVENTION

The invention relates to a process for the removing palladium catalyst residues incorporated in polymers during their preparation.

BACKGROUND OF THE INVENTION

Polymers of carbon monoxide and olefins, such as ethylene, have been known and available in limited quantities for many years. For example, polyketones are disclosed in Kirk-Othmer Encyclopedia of Chemical Technology, Second Edition, Vol. 12, p. 132, 1967, and in Encyclopedia of Polymer Science and Technology, 1968, Vol. 9, 397–402. The low molecular weight copolymers in particular may be used as intermediates for the production of plastics, as components in blends with other polymers (such as waxes and greases) and as pourpoint depressants for middle distillate petroleum fuel products. The higher molecular weight polymers have use and utility as premium thermoplastics for fibers, films, injection molding, compression molding or blowing applications.

High molecular weight linear polymers of carbon monoxide and ethylene in which monomer units occur in alternating order and which polymers consist of units of the formula

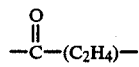

can be prepared by using Group VIII metal organic phosphine compounds as a catalyst, such as palladium organic phosphine compounds. For example U.K. Pat. No. 1,081,304, U.S. Pat. No. 3,689,460, and U.S. Pat. No. 3,694,412 disclose processes using palladium catalysts having monodentate alkyl phosphine ligands. Similar palladium catalysts having monodentate phosphine ligands are disclosed in the articles found in *J. Am. Chem. Soc.* 1982, 104, 3520-2, Organometallics 1984, 3, 866–70, *Proc. Ind. Assoc. Cult. Sci.* 1985, 68B, 1–5 and *CHEMTECH* 1986, 1, 48–51. European patent application No. 121,965 discloses a process for polymerizing CO and an alkenically unsaturated hydrocarbon using a Group VIII metal complex having bidentate phosphorous, arsenic or antimony ligands. Application of these catalysts to a monemer mixture which, in addition to carbon monoxide and ethen, comprises at least one olefinically unsaturated hydrocarbon having the general formula $C_xH_y$, which hydrocarbon has fewer than 20 carbon atoms and contains an olefinically unsaturated —CH=CH— group, leads to the formation of polymers with units of the formula

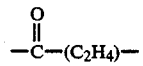

and units of the general formula

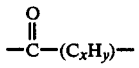

occurring randomly distributed within the polymer. The structure of the copolymers and "terpolymers" differs only in that in the case of the "terpolymers" a unit of

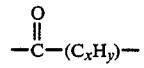

is encountered at some random places in the polymer instead of a unit of

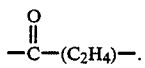

These polymers have excellent mechanical properties; especially, very high strength stiffness and impact resistance. However, the use of the Group VIII metal organic phosphine compounds as catalysts has the drawback that a considerable part of the metal catalyst remains in the polymers and cannot be removed therefrom by washing. The presence of a metal compound in the polymers is undesirable for two reasons. First, it poses problems to the processing of the generally high-melting polymers. This processing—for instance by injection molding—is done in the molten state with the polymer at a temperature at least 25° C. above its melting point. The presence of a metal compound in the polymers makes them incapable of withstanding the high temperatures required in the processing. Serious discoloring and decomposition of the polymers is the result. Decomposition can further cause severe gelling which is a considerable hindrance to the processing of the polymers. As a rule the processing problems become worse as the content of metal compound in the polymers increases.

Second, it is undesirable that metal catalyst residue should be present in the polymers in that the catalyst is continually removed from the process of preparation and has to be supplemented to maintain the reaction. This reason concerns the cost of the catalyst. Although the concentration of catalyst in the process is small, when virtually all the metal employed ends yp in the prepared polymer, it becomes a considerable expense to continually replace the catalyst especially for expensive Group VIII metals such as palladium. This may form a serious impediment to the polymer preparation being applied on a technical scale.

SUMMARY OF THE INVENTION

Recently, it has been shown that a Group VIII metal compound can be removed at least partly from a polymer by contacting the polymer with carbon monoxide or a carbon monoxide containing gas. The present invention therefore relates to a process for reducing catalyst residues from a Group VIII metal compound-containing polymer of CO, ethylene and optionally at least one olefinically unsaturated hydrocarbon. The process comprises contacting the polymer containing a Group VIII metal compound with an effective amount of carbon monoxide or a carbon monoxide-containing gas. The invention also relates to a process for reducing catalyst residues from a palladium compound-containing polymer of CO, ethylene and optionally at least one olefinically unsaturated hydrocarbon and recovering a palladium catalyst for the preparation of such polymers. The application further relates to the polymers from which at least part of the palladium has been thus removed as well as to articles of manufacture which consist at least partly of the polymers thus purified.

DESCRIPTION OF THE INVENTION

In the process according to the invention the carbon monoxide or carbon monoxide containing gas is preferably contacted with a suspension of the polymer in an organic liquid. Very suitable organic liquids are lower alcohols, such as methanol and ethanol. The treatment of a polymer suspension with carbon monoxide or carbon monoxide containing gas is preferably carried out at a temperature of at least 60° C.

In the process according to the invention the polymer is contacted with an effective amount of a carbon monoxide or a carbon monoxide containing gas. An effective amount is the amount necessary to reduce catalyst residues and improve processability of a Group VIII metal compound-containing polymer of CO, ethylene and optionally at least one olefinically unsaturated hydrocarbon.

In the process according to the invention the carbon monoxide partial pressure is preferred to be at least 0.1 bar. Preferably the carbon monoxide partial pressure is at least 0.5 bar and more preferably at least 1 bar. The treatment of the polymer suspension with carbon monoxide or a carbon monoxide-containing gas should be executed at a temperature of at least 60° C. Preferably the treatment is carried out at a temperature of 80°–200° C. and in particular of 100°–150° C. The duration of the treatment preferably is at least 5 minutes and more preferably at least 15 minutes.

In the process according to the invention the polymer product obtained is a polymer having a reduced Group VIII metal compound content and therefore impoved thermal stability. In addition, a Group VIII metal compound-containing solution is obtained. It has been found that the Group VIII metal compound present in the solution possesses catalytic activity, so that the solution can be used to prepare an additional amount of polymer. Alternately, by decomposition of the Group VIII metal compound, the Group VIII metal can be recovered and subsequently be used again to prepare the Group VIII metal phosphine composition which is used as the catalyst for preparation of the polymer.

If the removal of the Group VIII metal content from the polymer obtained in the process according to the invention is considered insufficient, the process can be repeated once or several times. To this end the polymer, after having been separated from the Group VIII metal compound-containing solution previously, is again allowed to suspend in fresh organic liquid, upon which the suspension is again contacted with carbon monoxide or a carbon monoxide-containing gas. The treatment according to the invention can be carried out either batch-wise or continuously, for instance on the counter current principle.

As indicated hereinbefore, the process according to the invention relates to polymers prepared by using an Group VIII metal compound as the catalyst. Examples of such catalysts are alkylphosphine and arylphosphine complexes of palladium, such as bis(tributylphosphine)PdCl$_2$, bis(triphenylphosphine)PdCl$_2$, $\pi$-alkyl(triphenylphosphine)PdCl and tetrakis(triphenylphosphine)Pd.

For the preparation of the present polymers there is a strong preference for the use of a certain class of catalysts. These catalysts, which possess a much higher activity than those mentioned above, comprise a compound of a Group VIII metal selected from the group consisting of palladium, cobalt and nickel, an anion of an non-hydrohalogenic acid with a pKa of less than 6, and a bidentate ligand (BDL) phosphine of the general formula

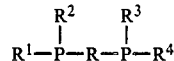

The groups $R^1$, $R^2$, $R^3$ and $R^4$ present in the bidentate ligand phosphine preferably contain 6 to 14 carbon atoms. Particularly preferred are BDL phosphines in which the groups $R^1$, $R^2$, $R^3$ and $R^4$ are phenyl groups, alkyl-substituted phenyl groups and phenyl groups containing polar group substituents, such as alkoxy groups. The bivalent organic bridging group R preferably contains three carbon atoms in the bridge. Examples of suitable bidentate ligand phosphines are the bisphosphine 1,3-bis(di-p-tolylphosphino)propane and 1,3-bis(diphenylphosphino)propane and the triphosphine 2-methyl-2-(methyldiphenylphosphino)-1,3-bis(diphenylphosphino)propane. Preference is given to the use of either one of the latter two BDL phosphines. For the sake of brevity these catalysts will hereinafter be referred to as 'BDL' (bidentate ligand) catalysts. In the preparation of the polymers it is preferred to use a BDL catalyst comprising a palladium salt of a carboxylic acid, in particular palladium acetate. Examples of suitable acids with a pKa of less than 6 (determined in aqueous solution at 18° C.) are sulfonic acids, such as methanesulfonic acid, trifluoromethane-sulfonic acid and paratoluenesulfonic acid, and carboxylic acids, such as trichloroacetic acid difluoroacetic acid and trifluoroacetic acid. p-Toluene-sulfonic acid and trifluorocetic acid are preferred. In the BDL catalyst the anion of the acid with a pKa of less than 6 preferably occurs in a quantity of from 0.5 to 200, and in particular of from 1.0 to 100, equivalents per gram atom of Group VIII metal. In the BDL catalysts the BDL phosphine preferably occurs in a quantity of 0.1–2, and in particular of 0.9–1.1, mol per mol of Group VIII metal compound.

The quantity of BDL catalyst used in the preparation of the polymers may vary within wide ranges. A quantity of BDL catalyst is employed per mol of olefinically unsaturated hydrocarbon to be polymerized which preferably comprises $10^{-7}$–$10^{-3}$, and in particular $10^{-6}$–$10^{-4}$, gram atom of palladium. The preparation of the polymers using a BDL catalyst is preferably carried out at a temperature of 20°–150° C. and a pressure of 1–200 bar and in particular at a temperature of 30°–100° C. and a pressure of 20–100 bar.

The process according to the invention relates to the removal of catalyst residues from polymers of carbon monoxide with ethylene and optionally at least one olefinically unsaturated hydrocarbon. The latter olefinically unsaturated hydrocarbons preferably have the general formula $CHR_1=CHR_2$, wherein the grous $R_1$ and $R_2$ together contain fewer than 18 carbon atoms and $R_1$ is an hydrocarbon group, and $R_2$ is hydrogen or an hydrocarbon group. In the latter case $R_1$ and $R_2$ may together form part of a cyclic structure, as in the monomers cyclopentene and cyclohexene. Preference for the hydrocarbons groups $R_1$ and $R_2$ is given to alkyl groups. Especially preferred are monomers in which $R_2$ is hydrogen, while $R_1$ is an alkyl group and more specifically a methyl group. In the mixture to be polymerized the molar ratio of the olefinically unsaturated hydrocarbons relative to carbon monoxide preferably is 10:1-1:5 and in particular 5:1-1:2.

The polymers to which the process according to the invention relates are normally prepared to contacting the monomers at elevated temperatures and pressure with a solution of the catalyst in an organic liquid. Very suitable organic liquids are lower alcohols, such as methanol and ethanol. During the polymerization the polymer is obtained in the form of a suspension in the organic liquid. After the desired level of polymerization is reached, the polymerization is usually terminated by cooling and releasing the pressure. The polymer can be isolated from the suspension by filtration, washing and drying. The process according to the invention can be carried out by resuspension of a polymer thus prepared and by contacting this suspension with carbon monoxide or a carbon monoxide-containing gas and heating the mixture to the desired temperature. However, it is preferred to apply the treatment according to the invention to the polymer suspension such as it is obtained in the polymer preparation, i.e. without previous isolation of the polymer. This can very suitable be done by first terminating the polymerization by releasing the pressure and removing gases present in the reactor by flushing the reactor once or several times with carbon monoxide or a carbon monoxide-containing gas, and subsequently pressurizing the reactor with carbon monoxide or a carbon monoxide-containing gas until the desired pressure is reached, bringing the contents of the reactor to the desired temperature and maintaining that temperature for some time. After the reactor contents have been cooled and the pressure released, the purified polymer can be isolated.

The invention will now illustrated with the aid of the following examples.

EXAMPLE 1

A carbon monoxide/ethylene copolymer was prepared as follows. 170 ml Methanol was introduced into a mechanically stirred autoclave of 300 ml capacity. The air present in the autoclave was expelled by pressurizing the autoclave with carbon monoxide until a pressure of 50 bar was reached, then releasing the pressure and repeating this treatment twice. After the contents of the autoclave had been brought to 65° C., a 1:1 carbon monoxide/ethylene mixture was introduced under pressure until a pressure of 55 bar was reached. Subsequently a catalyst solution was introduce into the autoclave, consisting of:

36 ml methanol,
0.06 mmol palladium acetate,
0.06 mmol 2-methyl-2(methyldiphenylphosphino)-1,3-bis(diphenylphosphino)propane and
0.12 mmol para-toluenesulfonic acid.

The pressure was maintained at 55 bar by introducing under pressure a 1:1 carbon monoxide/ethylene mixture. After 1½ hours the polymerization was stopped by cooling the reaction mixture down to room temperature and releasing the pressure. The copolymer was filtered off, washed with methanol and dried at 70° C. 12 g Copolymer with a palladium content of 475 ppmw was obtained, which means that 95% of the palladium present in the catalyst had remained behind in the copolymer.

EXAMPLE 2

A carbon monoxide/ethylene copolymer was prepared in substantially the same way as in Example 1, except that the polymerization was terminated by releasing the pressure, followed by the following procedure. The gases present in the autoclave were expelled therefrom by pressurizing the autoclave with carbon monoxide until a pressure of 55 bar was reached, then releasing the pressure and repeating this procedure once again. After the pressure had been brought to 3 bar carbon monoxide, the contents of the autoclave were heated to 120° C. and kept at this temperature for 30 minutes. After the contents of the autoclave had been cooled and the pressure released, the copolymer was filtered off, washed with methanol and dried at 70° C. 15 g Copolymer was obtained having a palladium content of 123 ppmw, which means that only 29% of the palladium present in the catalyst had remained behind in the copolymer.

EXAMPLE 3

The filtrate and the wash liquor obtained from filtering and washing the copolymer prepared according to Example 2 were mixed and the mixture with a volume of 150 ml was re-introduced into the autoclave. The air present in the autoclave was expelled therefrom a pressurizing the autoclave with carbon monoxide until a pressure of 50 bar was reached, then releasing the pressure and repeating this procedure twice over. After the contents of the autoclave had been brought to 65° C., a 1:1 carbon monoxide/ethylene mixture. After 2½ hours the polymerization was terminated by cooling the reaction mixture down to room temperature and releasing the pressure. The copolymer was filtered off, washed with methanol and dried at 70° C. 19 g Copolymer was obtained.

EXAMPLE 4

A carbon monoxide/ethylene copolymer was prepared in substantially the same way as in Example 2, except that the copolymer which had been treated with carbon monoxide was filtered off, washed but not dried. Subsequently, the copolymer was introduced together with 200 ml methanol into a stirred autoclave of 300 ml capacity. The air present in the autoclave was expelled therefrom by pressurizing the autoclave with carbon monoxide until a pressure of 50 bar was reached, then releasing with pressure and repeating this procedure twice over. After the pressure had been brought to 3 bar carbon monoxide, the contents of the autoclave were heated to 120° C. and kept at this temperature for 30 minutes. After the contents of the autoclave had been cooled down to room temperature and the pressure released, the copolymer was filtered off, washed with methanol and dried at 70° C. 15 g Copolymer was obtained, having a palladium content of 47 ppmw, which means that only 11% of the palladium present in the catalyst had remained behind in the copolymer.

EXAMPLE 5

A carbon monoxide/ethylene/propylene terpolymer was prepared as follows. 170 ml Methanol was introduced into a mechanically stirred autoclave of 300 ml capacity. The air present in the autoclave was expelled by pressurizing the autoclave with carbon monoxide until a pressure of 50 bar was reached, then releasing the pressure and repeating this procedure twice over. After 37.5 ml of liquified propylene had been introduced into the autoclave and the contents of the autoclave had been brought to 65° C., a 1:1 carbon monoxide/ethylene mixture was introduced with pressure until a pressure of 55 bar was reached. Then a catalyst solution was introduced into the autoclave, consisting of:

36 ml methanol,
0.06 mmol palladium acetate,
0.06 mmol 2-methyl-2-(methyldiphenylphosphino)-1,3-(bis(diphenylphosphino)propane and
0.15 ml trifluoroacetic acid.

The pressure was maintained at 55 bar by introducing under pressure a 1:1 carbon monoxide/ethylene mixture. After 2¾ hours the polymerization was stopped by releasing the pressure. The gases present in the autoclave were expelled by pressurizing the autoclave with carbon monoxide until a pressure of 55 bar was reached and then releasing the pressure. After the pressure had been brought to 55 bar carbon monoxide, the contents of the autoclave were heated to 110° C. and kept at that temperature for 30 minutes. After the contents of the autoclave had been cooled down to room temperature and the pressure released, the terpolymer was filtered off, washed with methanol and dried at 70° C. 8,7 g Terpolymer was obtained, having a palladium content of 2060 ppmw, which means that only 38% of the palladium present in the catalyst had remained behind in the terpolymer.

EXAMPLE 6

The filtrate and the wash liquor obtained from filtering and washing the terpolymer prepared according to Example 5 were mixed and the mixture with a volume of 185 ml was re-introduced into the autoclave. The air present in the autoclave was expelled by pressurizing the autoclave with carbon monoxide until pressure of 50 bar was reached, then releasing the pressure and repeating this procedure twice over. After 37.5 ml of liquefied propylene had been introduced and the contents of the autoclave had been brought to 65° C., a 1:1 carbon monoxide/ethylene mixture was introduced under pressure until a pressure of 55 bar was reached. The pressure was maintained at 55 bar by introducing under pressure a 1:1 carbon monoxide/ethylene mixture. After 3½ hours the polymerization was terminated by cooling the reaction mixture down to room temperature and releasing the pressure. The terpolymer was filtered off, washed with methanol and dried at 70° C. 5.1 g Terpolymer was obtained.

With the aid of $13_{C-NMR}$ analysis it was established that the carbon monoxide/ethene copolymers prepared according to Examples 1-4 possessed a linear alternating structure and consisted of units of the formula $-CO-(C_2H_4)-$ and units of the formula $-CO-(C_3H_6)-$, which units occurred randomly distributed within the terpolymers. The terpolymers had a melting point of 205° C.

Of Examples 1-6, Examples 2-6 are examples according to the invention. Example 1 falls outside the scope of the invention and has been included in the patent application for comparison. Example 2 demonstrates that the application of the process according to the invention can result in a considerable decrease of the palladium content of the polymers. Example 4 shows that a further decrease of the palladium content of the polymers can be achieved by repeating the process according to the invention. Examples 3 and 6 show that after the process according to the invention has been applied and the treated polymer has been filtered off from the suspension, there remains a filtrate which is an active catalyst solution.

What is claimed is:

1. A process for reducing catalyst residues in a polymer, which process comprises (1) suspending an isolated palladium compound catalyst-containing polymer of carbon monoxide, ethylene with or without at least one other olefinically unsaturated hydrocarbon in an organic liquid, (2) contacting the polymer suspension with an effective amount of carbon monoxide and (3) recovering a polymer having reduced palladium compound catalyst residues.

2. The process of claim 1 wherein the organic liquid is a lower alcohol.

3. The process of claim 2 wherein the organic liquid is selected from the group consisting of methanol and ethanol.

4. The process of claim 3 wherein effective amount of carbon monoxide is carbon monoxide partial pressure of at least 0.1 bar.

5. The process of claim 3 wherein effective amount of carbon monoxide is carbon monoxide partial pressure of at least 0.5 bar.

6. The process of claim 3 wherein effective amount of carbon monoxide is carbon monoxide partial pressure of at least 1 bar.

7. The process of claim 4 wherein the palladium compound catalyst is a palladium organic phosphine compound.

8. The process of claim 7 wherein the polymer suspension is contacted with carbon monoxide for at least 5 minutes.

9. The process of claim 7 wherein the polymer suspension is contacted with carbon monoxide for at least 15 minutes.

10. The process of claim 7 wherein contacting temperature is at least 60° C.

11. The process of claim 7 wherein contacting temperature is from about 80° to about 200° C.

12. The process of claim 7 wherein contacting temperature is from about 100° to about 150° C.

13. The process of claim 10 which further comprises repeating the process at least once.

14. The process of claim 12 wherein other olefinically unsaturated hydrocarbon is propylene.

15. The process of claim 12 wherein the polymer is a polymer of carbon monoxide and ethylene.

16. A process for preparing a polymer having reduced catalyst residues which process comprises (1) contacting carbon monoxide, ethylene with or without propylene in the presence of a catalyst obtained from a palladium compound, an anion of a non-hydrohalogenic acid having a pKa less than 6, and a bidentate phosphine ligand of the general formula

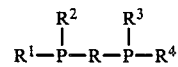

wherein R is a bivalent organic bridging group having a bridge containing three carbon atoms, and $R^1$, $R^2$, $R^3$ and $R^4$ are hydrocarbon or substituted hydrocarbon, in the presence of a lower alcohol and under conditions suitable for preparing a polymer suspension in the lower alcohol, (2) preparing a polymer suspension in the lower alcohol, (3) contacting the polymer suspension subsequent to its preparation but prior to recovery of the polymer with an effective amount of carbon monoxide alone, and at a temperature of about 80° to about 200° C., and (4) recovering a polymer having reduced palladium catalyst residues.

17. The process of claim 16 wherein the lower alcohol is selected from the group consisting of methanol and ethanol.

18. The process of claim 17 wherein effective amount of carbon monoxide is carbon monoxide partial pressure of at least 0.1 bar.

19. The process of claim 17 wherein effective amount of carbon monoxide is carbon monoxide partial pressure of at least 0.5 bar.

20. The process of claim 17 wherein effective amount of carbon monoxide is carbon monoxide partial pressure of at least 1 bar.

21. The process of claim 18 wherein the palladium compound is a palladium salt of a carboxylic acid.

22. The process of claim 18 wherein the palladium compound is palladium acetate.

23. The process of claim 21 wherein the anion of an acid having a pKa less than 6 is an anion of an acid selected from the group consisting of sulfonic acids having a pKa of less than 6 and carboxylic acids having a pKa of less than 6.

24. The process of claim 21 wherein the anion of an acid having a pKa less than 6 is an anion of an acid selected from the group consisting of methane-sulfonic acid, trifluoromethanesulfonic acid, para-toluenesulfonic acid, trichloroacetic acid, difluoroacetic acid, and trifluoroacetic acid.

25. The process of claim 21 wherein the anion of an acid having a pKa of less than 6 is an anion of an acid selected from the group consisting of para-toluenesulfonic acid and trifluoroacetic acid.

26. The process of claim 24 wherein quantity of the anion of an acid having a pKa of less than 6 is from about 0.5 to about 200 equivalents per gram atom of palladium.

27. The process of claim 24 wherein quantity of the anion of an acid having a pKa of less than 6 is from about 1.0 to about 100 equivalents per gram atom of palladium.

28. The process of claim 26 wherein quantity of the bidentate phosphine ligand is from about 0.1 to about 2.0 mol per mol of palladium compound.

29. The process of claim 27 wherein quantity of the bidentate phosphine ligand is from about 0.9 to about 1.1 mol per mol of palladium compound.

30. The process of claim 25 wherein the hydrocarbon groups $R^1$, $R^2$, $R^3$, and $R^4$ of the bidentate phosphine ligand, each contain 6 to 14 carbon atoms.

31. The process of claim 30 wherein the hydrocarbon groups $R^1$, $R^2$, $R^3$ and $R^4$ of the bidentate phosphine ligand are selected from the group consisting of phenyl groups, alkyl substituted phenyl groups, and phenyl groups with polar substituents.

32. The process of claim 25 wherein the bidentate phosphine ligand is selected from the group consisting of 1,3-bis(diphenylphosphino)propane and 2-methyl-2-(methyldiphenylphosphino)-1,3-bis(diphenylphosphino)propane.

33. The process of claim 25 wherein propylene is absent.

34. The process of claim 33 wherein quantity of the catalyst is from about $10^{-7}$ to about $10^{-3}$ gram atom of palladium per mol of ethylene.

35. The process of claim 33 wherein quantity of the catalyst is from about $10^{-6}$ to about $10^{-4}$ gram atom of palladium per mol of ethylene.

* * * * *